(12) United States Patent
Uchida et al.

(10) Patent No.: US 6,627,277 B1
(45) Date of Patent: Sep. 30, 2003

(54) POLYTETRAFLUOROETHYLENE TUBING AND EXTRUDER FOR THE PRODUCTION THEREOF

(75) Inventors: Tatsuro Uchida, Osaka (JP); Shinji Murakami, Osaka (JP); Shoji Kawachi, Osaka (JP)

(73) Assignee: Daikin Industries Ltd., Osaka (JP)

(*) Notice: Subject to any disclaimer, the term of this patent is extended or adjusted under 35 U.S.C. 154(b) by 0 days.

(21) Appl. No.: 09/485,902

(22) PCT Filed: Aug. 12, 1998

(86) PCT No.: PCT/JP98/03592

§ 371 (c)(1),
(2), (4) Date: Feb. 18, 2000

(87) PCT Pub. No.: WO99/10159

PCT Pub. Date: Mar. 4, 1999

(30) Foreign Application Priority Data

Aug. 21, 1997 (JP) ............................................. 9-224973

(51) Int. Cl.⁷ ............................. B29D 22/00; B27J 5/00; D01D 5/24; B28B 11/12; C08F 214/00
(52) U.S. Cl. ..................... 428/35.7; 428/34.1; 264/127; 264/209.1; 425/289; 521/145
(58) Field of Search ............................ 428/35.7, 34.1; 264/127, 209.1; 425/289; 521/145

(56) References Cited

U.S. PATENT DOCUMENTS

| | | | | |
|---|---|---|---|---|
| 4,104,394 A | * | 8/1978 | Okita | ............................ 264/89 |
| 4,177,334 A | | 12/1979 | Okita | |
| 4,225,547 A | * | 9/1980 | Okita | ........................... 264/127 |
| 4,749,531 A | | 6/1988 | Borger et al. | |
| 5,622,732 A | | 4/1997 | Beckwith | |

FOREIGN PATENT DOCUMENTS

| | | |
|---|---|---|
| GB | 1590275 A | 5/1981 |
| GB | 1590275 | 5/1981 |
| JP | 5034661 A | 4/1975 |
| JP | 53034868 A | 3/1978 |
| JP | A 55-42869 | 3/1980 |
| JP | 55042869 A | 3/1980 |
| JP | 6154578 B2 | 11/1986 |
| JP | A 4-185426 | 7/1992 |
| JP | 9314646 A | 12/1997 |
| JP | A 9-314646 | 12/1997 |

OTHER PUBLICATIONS

Takaomi Satokawa, "Fluoro–Resin Handbook," pp. 112–116, (Nov. 1990).
Fuji Oguri, "Standard Machine Designing Diagram Handbook," pp. 1–5, (Mar. 1969).

\* cited by examiner

Primary Examiner—Elizabeth Mulvaney
Assistant Examiner—L. Ferguson
(74) Attorney, Agent, or Firm—Birch, Stewart, Kolasch & Birch, LLP (57) ABSTRACT

In an extruder for producing a polytetrafluoroethylene tube having a minimum thickness deviation by extruding a polytetrafluoroethylene paste through an annular portion formed by a core pin (30) and a die orifice (50) around it, the core pin comprises a mandrel connection end (34) which is connected to a mandrel and a die orifice outlet end (36) which is located at a die orifice outlet end, and the core pin has between the ends a portion of which cross-section perpendicular to an axial direction of the core pin has a smaller area than that of a cross-section of each end of the core pin. By using the extruder, the tube having a thickness deviation of not larger than 15% can be obtained.

14 Claims, 5 Drawing Sheets

POLYTETRAFLUOROETHYLENE TUBING AND EXTRUDER FOR THE PRODUCTION THEREOF

This application is the national phase under 35 U.S.C. §371 of PCT International Application No. PCT/JP98/03592 which has an International filing date of Aug. 12, 1998, which designated the United States of America.

TECHNICAL FIELD

The present invention relates to a polytetrafluoroethylene tube which has a small wall thickness deviation and an apparatus and a process for the production of such a tube.

BACKGROUND ART

As a production process of a polytetrafluoroethylene tube, a paste extrusion process has been hitherto known. In that process, a paste material is prepared by adding a suitable organic solvent called as a lubricant into a fine powder of a polytetrafluoroethylene (hereinafter, referred so as also "PTFE") produced by emulsion polymerization; the paste material is preformed into a cylinder so as to obtain a billet; the billet is charged into an extruder which extrudes the billet into a tube form while pressing using a ram; and then the lubricant is removed from the tube by heating or extraction followed by sintering the tube so as to finally obtain a predetermined tube (see, for example, Fluoro-Resin Handbook edited by Takaomi Satokawa published by Nikkan-Kogyo-Shinbun-sha (1990)).

Figure 1:
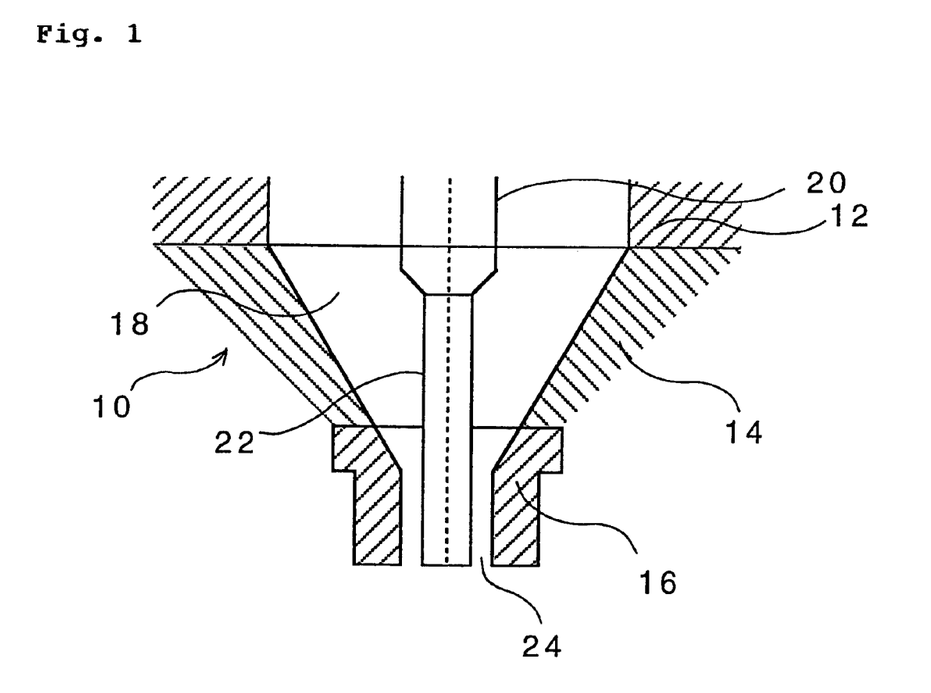
FIG. 1 schematically shows a cross-section of an end portion of a ram extruder from which a tube is extruded.

A cross-section of an end portion a ram extruder used for the above process is schematically shown in FIG. 1 from which portion a tube is extruded. The extruder 10 comprises a cylinder 12, a master die 14 and a die orifice 16, which form a space 18. A mandrel 20 and a core pin 22 which is attached to the mandrel are coaxially located within the space 18. A billet is supplied into such a space of the extruder. When the billet is extruded by a ram (not shown) from the upper side to the lower side of the figure, a tube is obtained from an annular outlet 24 of the die orifice. A lubricant is removed from the tube, which is then sintered so as to finally produce a predetermined tube.

When a shaped article is produced in the form of a tube from the polytetrafluoroethylene in the above described process, the mandrel 20 and the core pin 22 have to be so located that their axes are aligned with a center axis of the space 18 which is formed by the cylinder 12, the master die 14 and the die orifice 16. However, one end of the core pin 22 cannot be supported at a level of an outlet 24 of the die orifice 16, so that the core pin is cantilevered at a lower end of the mandrel 20 to which the core pin is attached, and such mandrel is cantilevered at its upper end. Therefore, it is not easy at all to a center the core pin 22 with the die orifice 16 around at the level near the outlet 24 of the die orifice 16. In fact, it is extremely difficult and almost impossible to substantially align a center axis of the core pin 22 with a center axis of the die orifice 16. As a result, a wall thickness of a currently and commercially available PTFE tube, especially one which has a lager diameter (for example, a tube having an inner diameter of not smaller than 10 mm), fluctuates largely. That is, wall thickness deviation phenomenon occurs in that a thickness in a radial direction (wall thickness) of the tube across its cross-section which is perpendicular to a longitudinal direction of the tube is different depending on a radial orientation.

DISCLOSURE OF THE INVENTION

Therefore, it is an object of the present invention to minimize the wall thickness deviation of the tubular article produced by paste extrusion of the PTFE.

The present inventors have made extensive studies so as to achieve the above object, and found that dimensioning a core pin such that at least a portion thereof can bend (or deflect) due to a pressure applied upon the extrusion provides an automatic centering function with an extruder (namely, a function to automatically align an axis of a core pin with an axis of a die orifice), so that the above object is achieved.

Generally, an elongated object which is supported at a single point is placed in a fluid which is flowing, the object moves in such a direction that a resistance which acts on the object is likely to be minimized. That is, when a supported portion of the object is able to freely rotate, the elongated object so moves that its longitudinal direction is to be parallel to a flowing direction of the fluid; and when the supported portion is constrained, the object itself bends such that the resistance is minimized. The present inventors have found that when a phenomenon similar to the above phenomenon occurs in the paste extruder for the PTFE, the core pin is so located that resistance acting on the core pin is minimized, so that the core pin is centered with the die orifice, whereby a polytetrafluroethylene tube having a minimized wall thickness deviation is obtained.

Generally, in an extruder, a mandrel is mechanically fixed at its one end which is opposed to a die orifice outlet while aligned with a cylinder, and a core pin is fixed to the mandrel at the other end thereof. The reason why a tube extruded while pressing in a longitudinal direction of the mandrel by a ram using such extruder has the wall thickness deviation is that the core pin is decentered because of a certain cause even if the mandrel is firmly fixed (namely, the core pin becomes not concentric with the die orifice, and for example, a center axis of the core pin is inclined relative to a center axis of the die orifice), and such decentered state is enlarged on an outlet side of the die orifice so that the center of the core pin is greatly deviated from the center of the die orifice. Upon such deviation, on a side where a thinner wall thickness of the tube is formed, the core pin forms an angle which is smaller than 180° with respect to a direction of an overall resin flow in a cylinder caused by ram pressing, namely a direction of a center axis of the cylinder (namely, the angle being formed between the mandrel and the core pin). To the contrary, on a sidle where a thicker wall thickness of the tube is formed, the core pin forms an angle which is larger than 180° with respect to the direction of the overall resin flow (namely, the angle being formed between the mandrel and the core pin).

In the above situation, the angle which is smaller than 180° produces a resistance against the resin flow, the core pin tries to move so as to reduce the resistance (namely, the core pin tries to approach the center axis of the die orifice). If the core pin could move so as to reduce the resistance, as a result of this the center of the core pin can substantially approach the center of the die orifice at a level of the outlet end of the die orifice. That is, the core pin is able to move so as to minimize the wall thickness deviation.

For example, in the case where the center of the core pin is deviated from the center of the die orifice at a level near the die orifice outlet due to a certain reason before the extrusion, whether the center of the core pin can or cannot return to the center of the die orifice (namely, becoming a concentric state) or approach the center of the die orifice at the level near the die orifice outlet depends on whether the core pin can or cannot bend (or deflect) under the extrusion conditions. Thus, the present invention resides in that shaping the core pin of the extruder such that it bends more easily than the conventional (or prior art) core pin so that the center of the core pin easily returns to the center of the die orifice around the core pin, which leads to the improved centering condition, whereby the wall thickness deviation of the extruded tube is improved.

Thus, in the first aspect, the present invention provides an extruder which produces a polytetrafluoroethylene tube by extruding a polytetrafluoroethylene through an annular portion which is formed by a core pin and a die orifice around the core pin, characterized in that the core pin comprises a mandrel connection end which is connected to a mandrel and a die orifice outlet end which is located at a level of a die orifice outlet, and the core pin has between its both ends a portion of which cross-section perpendicular to an axial direction of the core pin has a smaller area than that of a cross-section of each end of the core pin.

In the conventional extruder, the core pin was not designed while considering the bend of the core pin as described above. The core pin has a diameter at its one end which is substantially the same as a diameter of an end of the mandrel of the extruder so that the core pin is connected to the mandrel end, and also has a diameter at the other end which substantially corresponds to an inner diameter of a tube to be extruded. A diameter of a portion between those ends is gradually changed from one diameter to the other diameter (namely, an area of the cross-section of the core pin which is perpendicular to an axis direction of the core pin is gradually increase or decrease, or remains constant). It is noted that the core pin includes a portion of which diameter is constant, and not changed as in a core pin of a comparative example which will be described later, but the diameter of such a portion does not become smaller than a diameter of a cross-section of the mandrel or a cross-section of the core pin at a level of the die orifice outlet. Therefore, a diameter of a portion of the conventional core pin between its both ends is equal to or greater than a diameter at one end and equal to or smaller than a diameter at the other end, or such diameter is equal to a diameter at one end and also equal to a diameter at the other end.

To the contrary, in the extruder according to the present invention, the core pin has the portion of which cross-section is smaller than its both ends, so that the core pin more easily bend than that of the conventional extruder which does not have such a portion.

In the drawings, reference numerals indicate the following:

10 . . . extruder, 12 . . . cylinder, 14 . . . master die, 16 . . . die orifice, 18 . . . space, 20 . . . mandrel, 22 . . . core pin, 24 . . . annular outlet, 30 . . . core pin, 32 . . . thread, 34 . . . mandrel connection end, 36 . . . die orifice outlet end, 38 . . . mandrel connection end portion, 40 . . . first transition portion, 42 . . . cross-section decreasing portion, 44 . . . second transition portion, 46 . . . rectifying (or straightening) portion, 48 . . . through hole, 50 . . . die orifice, 52 . . . thread portion.

DETAILED DESCRIPTION OF THE INVENTION

In one embodiment of the extruder according to the present invention, the core pin is composed of a mandrel connection portion, a first transition portion, a cross-section decreased portion, a second transition portion and a rectifying portion (a cross-section of each portion which is perpendicular to an axis direction of the core pin is substantially circular) in the order as listed here from the mandrel connection end toward the die orifice outlet end, and each portion is integrally connected to its adjacent portion through their ends having substantially the same diameters. As to an area of the cross-section of the core pin which cross-section is perpendicular to the axis of the core pin, the cross-section decreased portion is characterized in that it is smaller than the mandrel connection portion and the rectifying portion.

The mandrel connection portion gives the core pin a strength and so on when the core pin is connected to the mandrel. Usually, the mandrel connection portion has a portion having a connection means (such as a threaded portion) which connects the core pin to the mandrel. It is noted such portion is excluded as to the comparison of the cross-sectional area of the cross-section decreased portion since that portion is inserted into an inside of the mandrel. The rectifying portion orients a flow of the polytetrafluoroethylene to be extruded along a fixed direction (preferably along the axis direction of the core pin), and it is required to keep a shape of the tube after it has been extruded out of the extruder. These two portions are required to have predetermined lengths and predetermined diameters, respectively. Thus, upon designing of these two portions, bending is a secondary factor. As to the cross-section decreased portion, bending is to be considered as the primary factor, and it is preferable that the dimension of this portion is properly selected so that most and preferably substantially all of an extent to which the core pin is able to bend is provided by an extent to which the cross-section decreased portion is able to bend.

It is noted that upon the selection of the dimension of the core pin, the size of the core pin should be employed such that the core pin is not broken since a great force is applied to the core pin during extrusion. Therefore, considerations as to such breakage are necessary when the dimension, especially the length and the diameter of the cross-section decreased portion are determined. In the present invention, the core pin is preferably so designed that it is surely able to bend as much as possible provided that it is not broken.

As to the embodiment described above, in a preferable embodiment, each of the mandrel connection portion, the cross-section decreased portion and the rectifying portion is in the form of a column, and the first transition portion and the second transition portion have tapered surfaces (thus, truncated cone portions). The tapered surface of the first transition portion connects the mandrel connection portion with the cross-section decreased portion, and the tapered surface of the second transition portion connects the cross-section decreased portion with the rectifying portion. In this case, the diameter of the cross-section decreased portion is smaller than the diameters of the other portions, and for example it is not larger than preferably two thirds (⅔), and more preferably one second (½) of the mandrel connection portion. It is desirable that the diameter of the cross-section decreased portion is furthermore smaller. In addition, the length of the cross-section decreased portion is as long as possible.

Generally, once the extruder is fixed, a total length of the core pin is fixed, and thus required lengths of the mandrel connection portion and the rectifying portion are fixed as described above, so that the rest of the total length can be used for the cross-section decreased portion and the transition portions. Therefore, it is preferable that the lengths of the transitions portions are designed as short as possible so that the length of the cross-section decreased portion is designed long. It is noted that the transition portions require certain lengths so that the length of the cross-section decreased portion may be often inherently determined when the extruder has been fixed, and thus appropriate selection of the diameter of the cross-section decreased portion is important.

As to bending as described above, the following idea may be used as a measure (it is to be noted that the idea does not bind the present invention):

In the extruder, the mandrel is so fixed that it is located in the center of the cylinder of the extruder. Considering that the core pin is fixed at its one end to the mandrel, the core pin may be regarded to be a cantilever, and the extent to which the core pin is able to bend as described above may correspond to a maximum deflection (or bending) extent of the cantilever.

Upon calculating the maximum deflection extent at a free end of the cantilever, for example Standard Machine Designing Diagram Handbook (Hyojun-Kikai-Sekkei-Zuhyo-Binran) (by Fujio Oguri, 5-1, 1969 published from Kyoritsu-Shuppan) may be referred to and the following equation can be used:

$$\delta_{max} = (wl^4)/(8EI)$$

wherein $\delta_{max}$ is a maximum deflection (cm), w is a divergent (or spreading) load per unit length (kg/cm), l is a member length (cm), E is Young's modulus (kg/cm²), and I is a moment of inertia of a cross section (cm⁴).

In the case wherein the maximum deflection extent of the cantilever is related to the extent to which the core pin is able to bend, the dimension of the core pin affects the cross-sectional area of the core pin (which corresponds to I) and the material of the core pin (which corresponds to E). Thus, as seen from the above equation, the extent to which the core pin is able to bend is directly proportional to the fourth power of the length of the core pin, and inversely proportional to the cross-sectional area of the core pin. The cross-sectional shape (or diameter) of the core pin changes along its axial direction, but what is mostly affects the extent to which the core pin is able to bend is the cross-section decreased portion of which is cross-sectional area is small and of which length is long. Therefore, in the extruder according to the present invention, the core pin, in particular its cross-section decreased portion is preferably as thin as possible and as long as possible.

It is of course clear that the material for the core pin affects the extent to which the core pin is able to bend, and thus it is desirable to use a material having a smaller Young's modulus. As to the material selection for the core pin, its various factors such as processability, corrosion resistance, strength and cost have to be considered, and it is generally not reasonable to favor only Young's modulus. Thus, the material for the core pin of the generally industrially used extruder (for example, a stainless steel, a surface plated iron and the like) may be used for the core pin of the extruder according to the present invention. Therefore, the dimension of the core pin is more important in the extruder according to the present invention.

As to a cross-sectional shape of the annular portion which is formed by the core pin and the die orifice is preferably in the form of a ring (thus, cross-sectional shapes of the core pin and the die orifice are both circular), but the other shape may be also possible as far as the cross-sectional shapes of the core pin and the die orifice are symmetrical as to a point. For example, each of the core pin and the die orifice may have an outwardly convex regular polygon shape, or an inwardly convex regular polygon shape (such as a star shape). Using such the core pin and the die orifice, tubes having various annular cross-sections may be produced. Even in those cases, the core pin has between its both ends a portion, of which cross-sectional area perpendicular to the axis direction of the core pin is smaller than the cross-sectional areas at its both ends.

In the second aspect, the present invention provides a process for the production of a polytetrafluoroethylene tube, which comprises the steps of: obtaining an extruded tube by paste extruding a PTFE, for example a PTFE prepared by emulsion polymerization with using the extruder as described above, and then removing a lubricant from the extruded tube (by for example extraction, evaporation drying and the like), and optionally the tube is sintered if necessary. It is noted that the paste extrusion of the PTFE is a well known extrusion process, and as to such a process, Japanese Patent Kokai Publication No. 50-34661, Japanese Patent Kokoku Publication No. 61-54578 and so on may be referred to.

According to the present process, since the core pin in the extruder which core pin is able to bend more than the core pin used in the conventional extruder as described above, the extruded tube is improved in its wall thickness deviation. Thus, the polytetrafluoroethylene tube finally obtained by the removal of the lubricant followed by sintering also has the improved wall thickness deviation.

Figure 2:
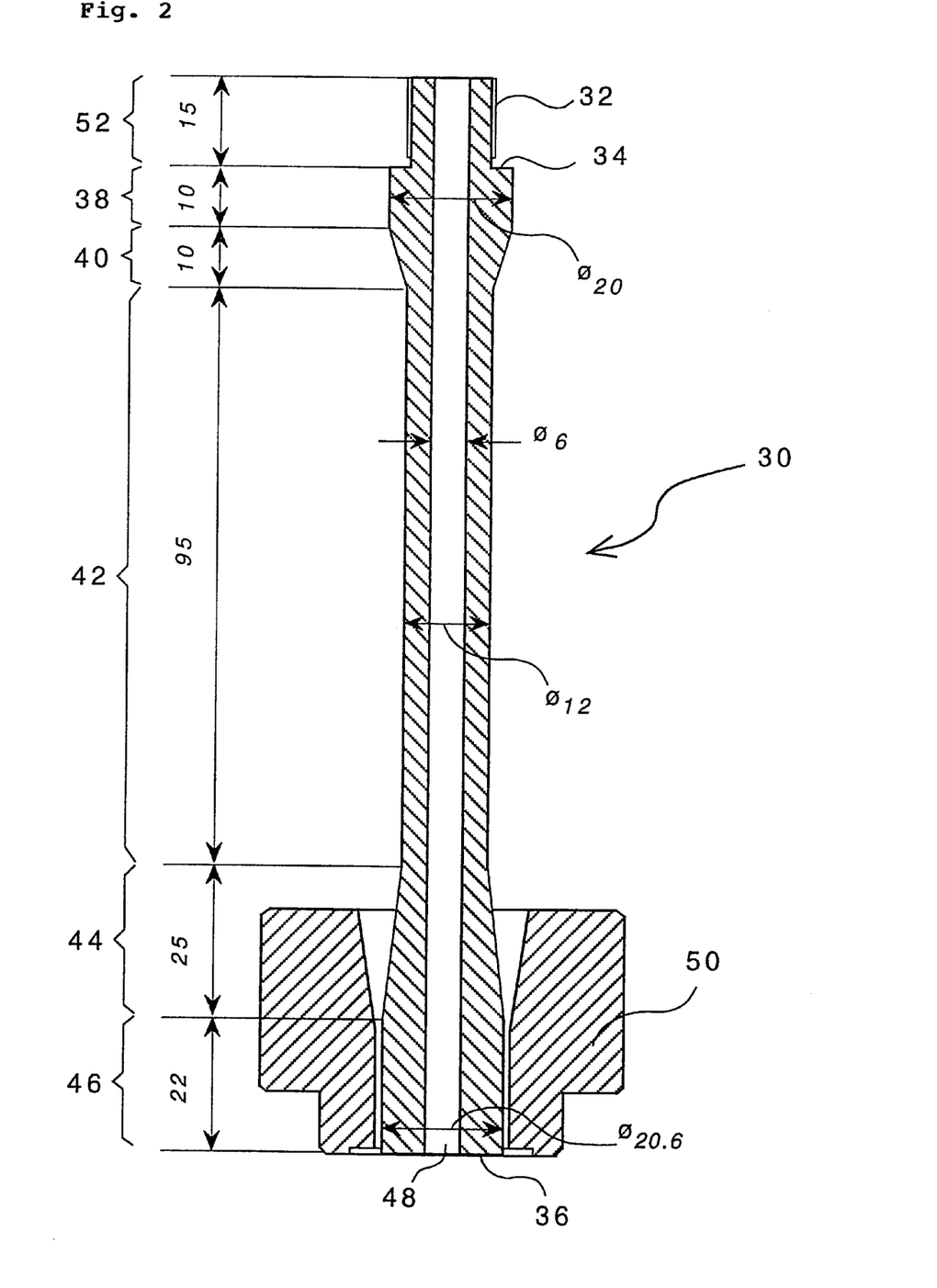
FIG. 2 schematically shows a cross-section along an axis direction of a core pin which is used in an extruder according to the present invention (used in Example 1)

In the third aspect, the present invention provides the polytetrafluoroethylene tube produced by the process as described above. Based on the technical idea according to the present invention, it is clear that the larger extent to which the core pin is able to bend improves the wall thickness deviation of the obtained tube more. For example, when the core pin of which dimension is as shown in FIG. 2 explained below is selected, a tube can be produced which has the wall thickness deviation of not greater than 15% and preferably not greater than 10%, even which cannot be obtained by using the prior art. Particularly, a tube having a larger diameter, for example a tube having an inner diameter of not smaller than 10 mm, and especially a tube having an inner diameter of not smaller than 20 mm can generally achieve the wall thickness deviation of not greater than 15%. It is noted that:

wall thickness deviation=((maximum WT−minimum WT/mean WT)×100(%)

(wherein WT means a wall thickness), and "mean WT" is an average value of the value for wall thickness.

The polytetrafluoroethylene tube obtained according to the present invention as described above may be used for pipelines for chemicals, linings, braid hoses, covers for substrates, shrinkable tubes and the like. For example, in the case where the tube is covered on a substrate such as a roller, by placing the tube which is unsintered on the roller followed by sintering the tube, the tube tightly fits the roller due to its shrinkage.

As to the PTFE which is used in the extruder according to the present invention, it may be one produced by the suspension polymerization or one produced by the emulsion polymerization. Since the PTFE has an advantageous character in that it is easily oriented an formed into a fibrous form, a PTFE fine powder produced by the emulsion polymerization is particularly suitable.

Further, the PTFE used in the present invention may be one which contains a filler. As the filler, a carbonaceous powder, a carbonaceous fiber, an inorganic powder, an inorganic fiber, a metal or alloy powder, an organic powder or fiber and the like may be used. More concretely, the following may be exemplified: the carbonaceous powder or fiber such as carbon black, a carbon fiber or graphite; the oxide powder such as feldspar, silica, alumina, titanium oxide or iron oxide; the inorganic powder of, for example, silicon nitride, carbon nitride, aluminum nitride, boron nitride, zirconium carbide, silicon carbide, tungsten carbide, nickel carbide, zirconium sulfate, barium sulfate, kaolin, clay, talc, a glass beads or a glass balloon; the inorganic fiber such as a glass fiber, an alumina fiber, a sodium titanate fiber or a silica fiber; the metal or alloy powder of, for example, a copper alloy, hydrozincite, molybdenum disulfide, aluminum, or an aluminum alloy; and the organic powder or fiber of a perfluoroalkoxy resin, a perfluoroethylene-propene resin, a polychloro-trifluoroethylene resin, a polyamide-imide resin, a polyethersulphone resin, a polyether-imide resin, a polysulfone resin, a polyphenylenesulfide resin, a polycarbonate resin, a polyimide resin, a polyphenyleneoxide resin, an oxybenzoyl-polyester resin or a liquid crystal polymer. Those fillers are added so as to improve mechanical properties (such as abrasion resistance, compression strength or cold flow resistance) and/or electrical properties (electrostatic elimination) of extruded articles. An amount of the filler to be added is desirably not more than 50% by weight, and preferably not more than 30% by weight based on a total weight of the PTFE and the filler from a viewpoint in that the PTFE maintains the form of the extruded product.

Generally, it is easy to have the wall thickness deviation of the tube of not more than 15% according to the technical idea of the present invention, and usually, the wall thickness deviation of not more than 10%, and preferably not more than 5% can be achieved. Further, by appropriately selecting the material for the core pin (namely, the material from which the cross-section decreased portion is formed longer and more thinly because of its large tensile strength) and its dimension, the extent to which the core pin is able to bend may be further increased, which further improves the wall thickness deviation, so that the wall thickness deviation of not larger 1% or less is also possible.

To prepare an industrially practicable core pin while considering the strength required for repeatedly using thereof (namely, considering the safety margin), it is required to favor the strength, and it may be required to use a less expensive material at the expense of a certain extent to which the core pin is able to bend (even though the strength is unfavorable a little). Further, market needs are to be considered. Based on these, as to the wall thickness deviation of the tube according to the present invention, the wall thickness deviation between about 1% and about 15%, and preferably between about 2% and about 10% will be satisfactory, and it is sufficient to design the core pin which achieves such a wall thickness deviation.

PREFERRED EMBODIMENT TO PRACTICE THE INVENTION

One embodiment of the core pin of the extruder according to the present invention is schematically shown in FIG. 2 in a cross-sectional view. The shown core pin 30 is composed of the mandrel connection portion 38, the first transition portion 40, the cross-section decreased portion 42, the second transition portion 44 and the rectifying portion 46 in thus listed order when seeing in a direction from the mandrel connection end 34 to the die orifice outlet end 36 (the cross-section of each of the portions which cross-section is perpendicular to the axis of the core pin is circular). The mandrel connection end 34 is connected to the mandrel (not shown) with for example a thread 32. The tube (not shown) is extruded from the die orifice outlet end 36. It is noted that in the shown embodiment, the core pin 30 is provided with a thread portion 52 on the mandrel connection end 34 in order that the core pin 30 is connected to the mandrel, and also that the comparison of the cross-sectional area of the cross-section decreased portion does not take account of the thread portion 52 which is located above the mandrel connection end 34. Each composing portion is integrally connected to its adjacent composing portion through their ends each having the same diameter. As to the areas of the cross-section perpendicular to the axis of the core pin, the cross-section decreased portion 42 is smaller than the mandrel connection portion 38 and the rectifying portion 46. As shown in FIG. 2, the transition portions 40 and 44 have the tapered surfaces, and the other portions are of the column forms. It is preferable that the cross-section decreased portion 42 is thin and long as far as it is sufficiently strong.

It is noted that in the shown embodiment, a hole 48 is formed through the center of the core pin 30. The hole is used as a passageway of an evaporated lubricant (gas vent hole) when the lubricant is removed by heating subsequently after the tube has been extruded. In the present invention, when such a hole is present through the core pin, the comparison between the cross-sectional areas are based on the areas of substantially annular portions, not on the areas off the circles. Further, FIG. 2 shows a state in which the core pin 30 is inserted in the die orifice 50. It is noted that the italic numerals in the drawings are the sizes in a unit of "mm" of the core pin of one example thereof.

Figure 3:
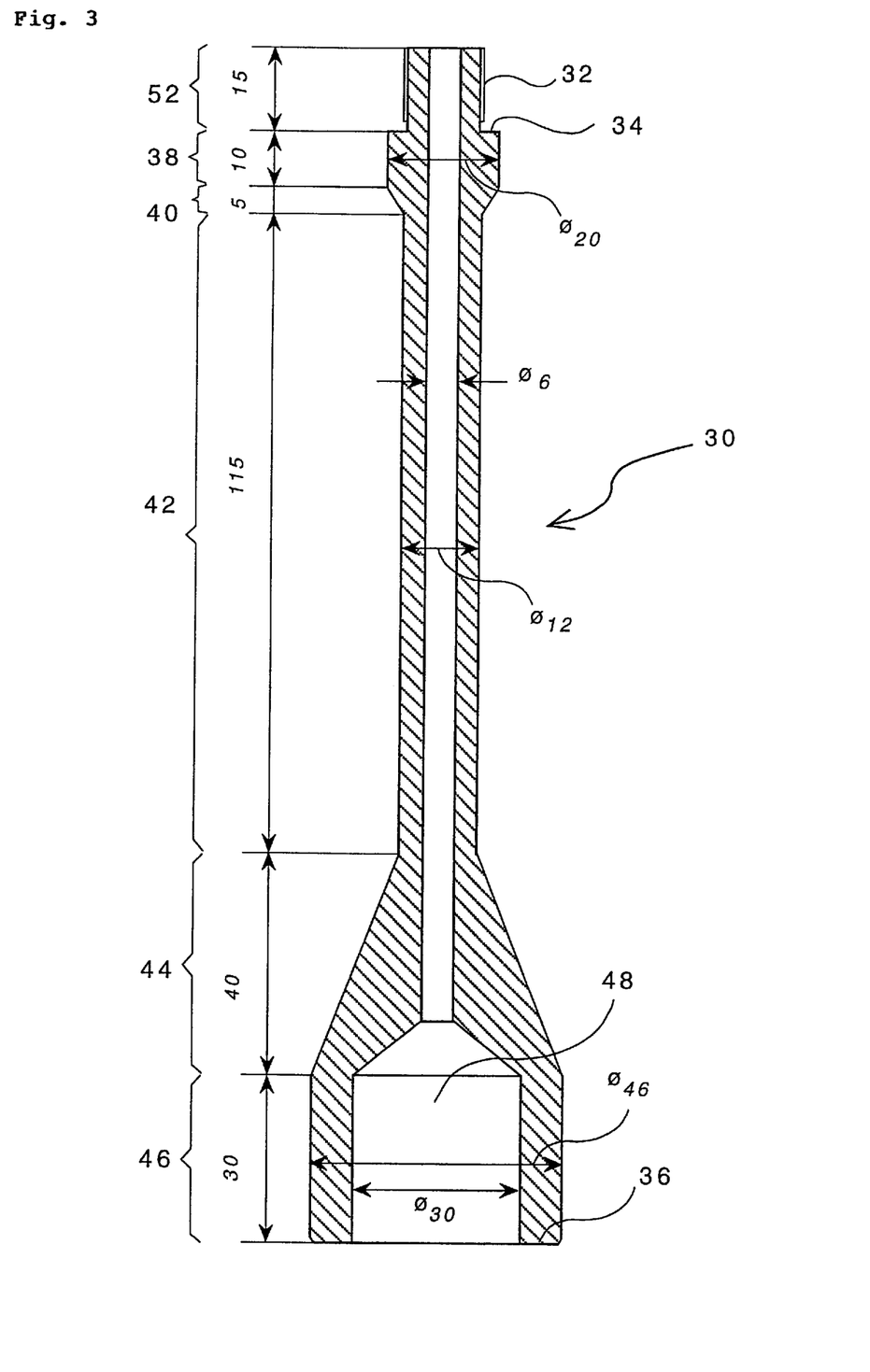
FIG. 3 schematically shows a cross-section along an axis direction of a core pin which is used in an extruder according to the present invention (used in Example 2)

In addition, similarly to FIG. 2, another embodiment of the core pin of the extruder according to the present invention is schematically shown in FIG. 3 in a cross-sectional view. The core pin 30 of FIG. 3 is used for extruding a tube having a larger diameter (nominal outer diameter: 40 mm) than the diameter of the tube in the case of FIG. 2. It is noted that no die orifice is shown in FIG. 3. Further, the gas vent hole 48 of the core pin 30 is splayed outwardly at the die orifice outlet end.

EXAMPLES

Example 1

21 Parts by weight of a hydrocarbon oil (Isoper E, manufactured by Exxon Chemical) as a lubricant was added to 100 parts by weight of a polytetrafluoroethylene fine powder (F-201, manufactured by Daikin Industries Ltd.), which was mixed and left as it was for 15 hours at a temperature of 25° C. for the maturation. After the maturation, the mixture was pressed using a ram at a speed of 100 mm/min. and held at a pressure of 10 kgf/cm$^2$ for ten minutes so as to obtain a cylindrical billet.

The billet was inserted into an extruder of which cylinder inner diameter was 90 mm and of which mandrel outer diameter was 20 mm, the core pin (made of SUS 304) having the dimension as shown in FIG. 2 was attached to the end of the mandrel, and the die orifice having a outlet diameter of 22.6 mm was mounted. Using a band heater, the end portion of the die was heated to a temperature of 60° C., and extrusion was carried out at a ram speed of 5 mm/min. so that a preform in the form of a tube was obtained.

The preform was heated from a room temperature to a temperature of 370° C. continuously, so that the lubricant was removed to dry followed by sintering, whereby an extruded article of the PTFE in the form of a tube was obtained. The obtained extruded article had the sizes and the wall thickness deviation as shown in Table 1 below.

Example 2

An extruded article of the PTFE in the form of a tube was obtained under the same conditions as in those of Example 1 except that a core pin having a dimension as shown in FIG. 3 was used and the die orifice was replaced with one having an outlet diameter of 49 mm. The extruded article had the sizes and the wall thickness deviation as shown in Table 1 below.

Comparative Example 1

Figure 4:
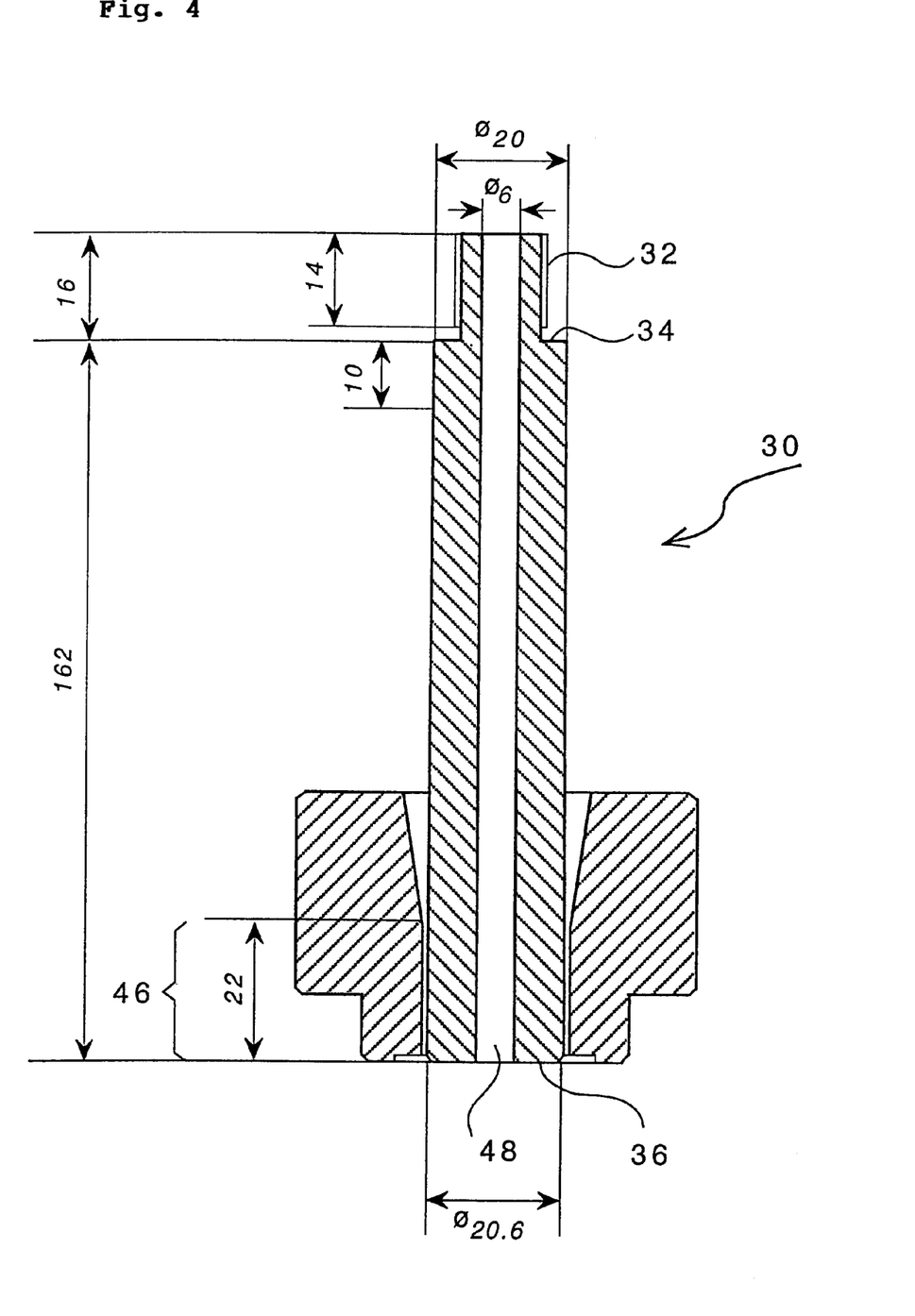
FIG. 4 schematically shows a cross-section along an axis direction of a core pin which is used in a conventional extruder (used in Comparative Example 1)

An extruded article of the PTFE in the form of a tube was obtained under the same conditions as in those of Example 1 except that a core pin 30 having a dimension as shown in FIG. 4 was used. Seeing from the mandrel connection end 34 toward the die orifice outlet end 36 along the axial direction, the shown core pin 30 had a diameter which is constant at 20 mm over a length of 10 mm, and then gradually increases up to 20.6 mm to the rectifying portion, and then the rectifying portion having a diameter of 20.6 mm continues. The extruded article had the sizes and the wall thickness deviation as shown in Table 1 below.

Comparative Example 2

Figure 5:
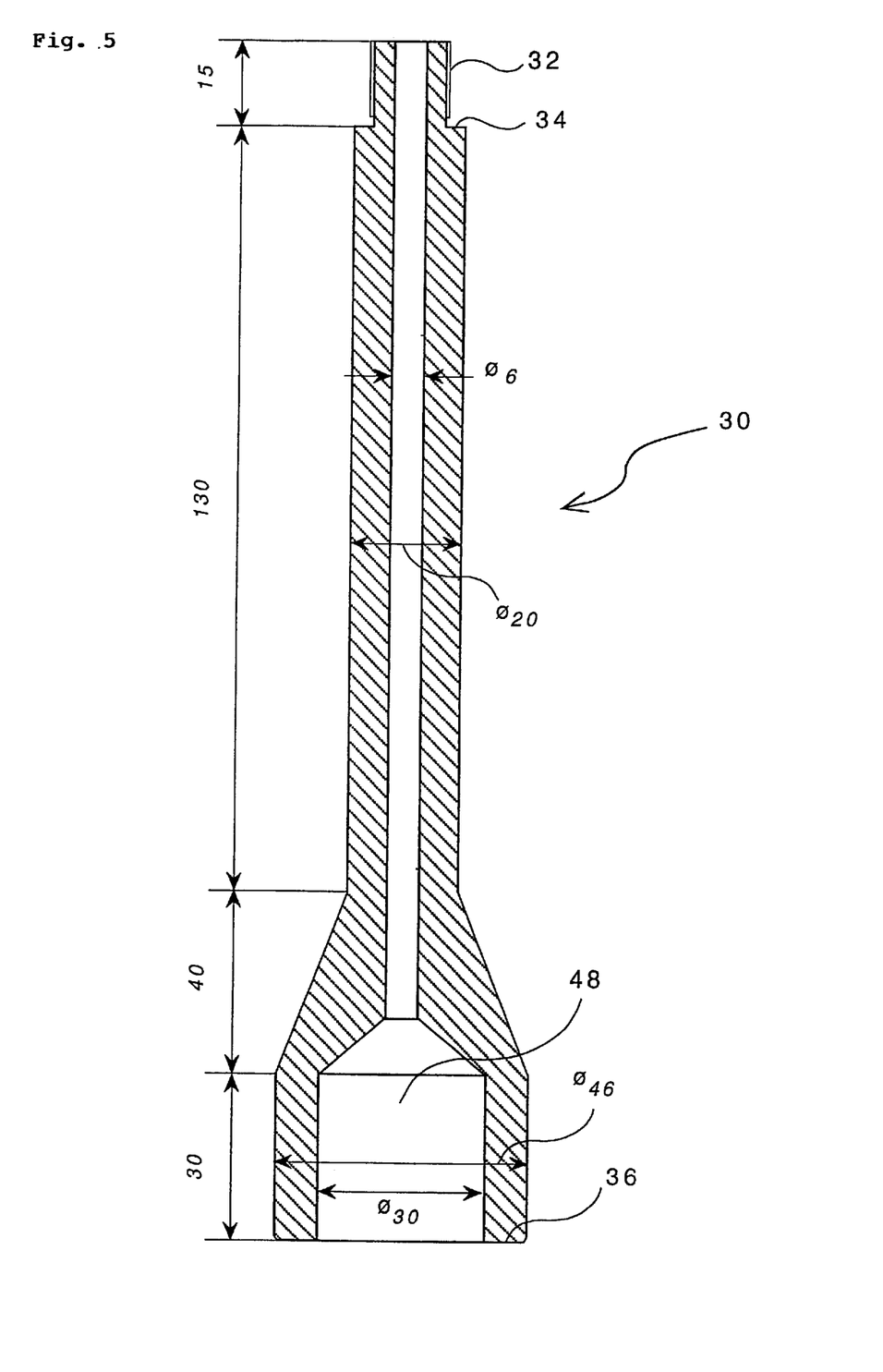
FIG. 5 schematically shows a cross-section along an axis direction of a core pin which is used in a conventional extruder (used in Comparative Example 2).

An extruded article of the PTFE in the form of a tube was obtained under the same conditions as in those of Example 1 except that a core pin having a dimension as shown in FIG. 5 was used. The extruded article had the sizes and the wall thickness deviation as shown in Table 1 below. As seen from FIG. 5, seeing from the mandrel connection end 34 toward the die orifice outlet end 36 along the axial direction, the shown core pin 30 had a constant diameter of 20 mm over a length of 130 mm, and then a diameter which gradually increases up to 46 mm over 40 mm, and thereafter a diameter is constant at 46 mm. With the core pin 30 in this embodiment, the cross-sectional area which is perpendicular to the axial direction is the smallest at the mandrel connection portion.

TABLE 1

| Tube Size (mm) | Ex. 1 | Comp. Ex. 1 | Ex. 2 | Comp. Ex. 2 |
| --- | --- | --- | --- | --- |
| Outer diameter | 19.95 | 19.95 | 40.73 | 40.73 |
| Average WT | 0.965 | 0.965 | 1.490 | 1.490 |
| Maximum WT | 0.994 | 1.089 | 1.620 | 1.730 |
| Minimum WT | 0.936 | 0.841 | 1.510 | 1.400 |
| WT deviation (%) | 6 | 26 | 7 | 22 |

Average WT (wall thickness) was obtained by averaging several wall thicknesses randomly measured.

What is claimed is:

1. A sintered and unexpanded polytetrafluoroethylene tube which has a wall thickness deviation of not larger than 15% and an inner diameter of at least 10 mm.

2. An extruder producing a polytetrafluoroethylene tube by extruding a polytetrafluoroethylene through an annular portion which is formed by a core pin and a die orifice around the core pin, characterized in that the core pin comprises a mandrel connection end which is connected to a mandrel and a die orifice outlet end which is located at a level of a die orifice outlet, and the core pin has between its both ends a portion of which cross-section perpendicular to an axial direction of the core pin has a smaller area than that of a cross-section of each end of the core pin.

3. The extruder according to claim 3 wherein the mandrel connection portion, a first transition portion, a cross-section decreased portion, a second transition portion and a rectifying portion, a cross-section of each portion which is perpendicular to an axis direction of the core pin is circular, in the order as listed here from the mandrel connection end toward the die orifice outlet end, and each portion is integrally connected to its adjacent portion through their ends having the same diameters, and as to an area of the cross-section of the core pin which cross-section is perpendicular to the axis of the core pin, the cross-section decreased portion is characterized in that it is smaller than the mandrel connection portion and the rectifying portion.

4. The extruder according to claim 3 wherein the cross-section decreasing portion is in the form of a column.

5. An unsintered and unexpanded polytetrafluoroethylene tube which has a wall thickness deviation of not larger than 15% and an inner diameter of at least 10 mm.

6. The unsintered and unexpanded polytetrafluoroethylene tube according to claim 5 which is a preform.

7. A process for the production of a polytetrafluoroethylene tube which process comprises the step of:

extruding a polytetrafluoroethylene with an extruder in the form of a tube, said extruder extrudes said polytetrafluoroethylene through an annular portion which is formed by a core pin and a die orifice around said core pin, wherein said core pin comprises a mandrel connection end which is connected to a mandrel and a die orifice outlet end which is located at a level of a die orifice outlet, and said core pin has between its both ends a portion of which cross-section perpendicular to an axial direction of the core pin has a smaller area than that of a cross-section of each end of said core pin; and obtaining the extruded polytetrafluoroethylene tube.

8. The process for the production of the polytetrafluoroethylene tube according to claim 7, wherein the mandrel connection portion, a first transition portion, a cross-section decreased portion, a second transition portion and a rectifying portion, wherein a cross-section of each portion which is perpendicular to an axis direction of the core pin is circular, in the order as listed here from the mandrel connection end toward the die orifice outlet end, and each portion is integrally connected to its adjacent portion through their ends having the same diameters, and as to an area of the cross-section of the core pin which cross-section is perpendicular to the axis of the core pin, the cross-section decreased portion is smaller than the mandrel connection portion and the rectifying portion.

9. The process for the production of the polytetrafluoroethylene tube according to claim 8, wherein the cross-section decreasing portion is in the form of a column.

10. The process for the production of the polytetrafluoroethylene tube according to claim 7, 8 or 9, wherein the tube is an unsintered and unexpanded tube having a wall thickness deviation of not larger than 15% and an inner diameter of at least 10 mm.

11. The process for the production of the polytetrafluoroethylene tube according to claim 7, 8 or 9, further comprising the steps of:
   removing a lubricant from the extruded tube after obtaining the extruded tube, and
   sintering the tube.

12. The process for the production of the polytetrafluoroethylene tube according to claim 11, wherein the tube is an unexpanded tube having a wall thickness deviation of not larger than 15% and an inner diameter of at least 10 mm.

13. A polytetrafluoroethylene tube produced by the process according to claim 7, 8 or 9.

14. A sintered polytetrafluoroethylene tube produced by the process according to claim 11.

* * * * *